(12) United States Patent
Pirrotta et al.

(10) Patent No.: US 9,170,602 B1
(45) Date of Patent: Oct. 27, 2015

(54) CALIBRATING A HIGH-SPEED CLOCK SIGNAL GENERATED USING A PROCESSOR INTERNAL TO THE ELECTRONIC AUTHENTICATION DEVICE WITHOUT USING A CRYSTAL OSCILLATOR

(75) Inventors: Joseph M. Pirrotta, Framingham, MA (US); Marco Ciaffi, Sudbury, MA (US)

(73) Assignee: EMC Corporation, Hopkinton, MA (US)

( * ) Notice: Subject to any disclaimer, the term of this patent is extended or adjusted under 35 U.S.C. 154(b) by 315 days.

(21) Appl. No.: 13/536,901

(22) Filed: Jun. 28, 2012

(51) Int. Cl.
  *G06F 1/04* (2006.01)
  *G06F 1/24* (2006.01)
  *G06F 11/00* (2006.01)
  *G06F 1/12* (2006.01)
  *G06F 1/10* (2006.01)
  *G06F 1/08* (2006.01)

(52) U.S. Cl.
  CPC .. *G06F 1/12* (2013.01); *G06F 1/10* (2013.01); *G06F 1/08* (2013.01)

(58) Field of Classification Search
  CPC ............... G06F 1/10; G06F 1/12; G06F 1/08
  USPC ........................................................ 713/503
  See application file for complete search history.

(56) References Cited

U.S. PATENT DOCUMENTS

| | | | |
|---|---|---|---|
| 6,728,234 B1* | 4/2004 | Hofmann et al. | 370/350 |
| 6,885,254 B2* | 4/2005 | Kranz | 331/74 |
| 2005/0270108 A1* | 12/2005 | Wilson et al. | 331/2 |
| 2007/0019770 A1* | 1/2007 | Bradley et al. | 375/360 |
| 2009/0168943 A1* | 7/2009 | Chao et al. | 375/376 |
| 2009/0296531 A1* | 12/2009 | Haartsen et al. | 368/47 |
| 2009/0322400 A1* | 12/2009 | Kuo | 327/299 |

* cited by examiner

*Primary Examiner* — Jaweed A Abbaszadeh
*Assistant Examiner* — Gayathri Sampath
(74) *Attorney, Agent, or Firm* — John T. Hurley; Jason A. Reyes; Krishnendu Gupta

(57) ABSTRACT

A method is used in calibrating an internal clock generator. An electronic device is instructed to output a high-speed clock signal which is communicated to an external calibration system. The high-speed clock signal is measured using measurement equipment associated with the external calibration system. One or more calibration values based on the measured clock signal value are calculated. The calculated calibration values are communicated to the electronic device. The electronic device is instructed to generate a calibrated clock signal by applying the one or more calibration values to an internally generated clock signal.

20 Claims, 5 Drawing Sheets

CALIBRATING A HIGH-SPEED CLOCK SIGNAL GENERATED USING A PROCESSOR INTERNAL TO THE ELECTRONIC AUTHENTICATION DEVICE WITHOUT USING A CRYSTAL OSCILLATOR

BACKGROUND

1. Technical Field

This application relates to calibrating an internal clock generator.

2. Description of Related Art

Various electronic devices require a more or less exact and reliable clock signal. Such clock signals are typically generated by various types of oscillators, which deliver an alternating current (AC) signal on a fixed or tunable frequency. There are certain applications which require an accurate reference frequency. Electronic paper display (EPD) driver and authentication tokes are but two of many such applications. In the case of EPDs, a typical requirement for an EPD driver is a precise 32.768K Hz clock.

Moreover, an increasing number of devices are designed to be operated by battery. These devices may be required to operate for a relatively long time, in some instances for one or more years. Examples of such devices include authentication tokens employing displays such as an LED or electronic paper display. In order to increase battery life, such devices are designed for reduced power consumption.

It is known in the art that high frequency crystal oscillators are generally much more accurate than resistor capacitor (RC) oscillators or internal clock signals generated by semiconductor devices such as a microprocessor. However, high frequency crystal oscillators are more costly, consume additional physical space, and have higher power consumption. For applications with extreme physical restrictions, it is sometimes impossible to include an external quartz crystal due to stringent space restrictions. RC oscillators available in semiconductor devices often have a high variation such that they don't provide the necessary precision.

SUMMARY OF THE INVENTION

A method is used in calibrating an internal clock generator. An electronic device is instructed to output a high-speed clock signal which is communicated to an external calibration system. The high-speed clock signal is measured using measurement equipment associated with the external calibration system. One or more calibration values based on the measured clock signal value are calculated. The calculated calibration values are communicated to the electronic device. The electronic device is instructed to generate a calibrated clock signal by applying the one or more calibration values to an internally generated clock signal.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Some Electronic Paper Display (EPD) drivers and other display drivers require a stable and accurate 32.768K Hertz frequency to reliably generate visible characters on Electronic Paper Displays. Due to packaging restrictions of some applications, it may be physically impossible to include an external quartz crystal to provide the require frequency. Ordinarily, a microprocessor chip would include a high speed RC circuit that generates a high-speed frequency used for instruction timing. From this frequency it is possible to divide the frequency via firmware to arrive at the 32.768K Hertz frequency; however, the RC circuit network typically varies across parts due to process variations. In fact, some vendors specify that the frequency of an RC circuit can vary by as much as +/−25%. This variance would cause the target 32.768K Hz frequency to vary greatly, thus making the EPD inoperable.

The techniques described herein may be applied to a number of applications that require a precise clock signal, such as authentication tokes. Additional details regarding authentication tokens may be found in U.S. Pat. No. 7,973,607 B1, entitled "RTC CIRCUIT WITH TIME VALUE ADJUSTMENT," issued on Jul. 5, 2011 and assigned to EMC Corporation of Hopkinton, Mass., which is hereby incorporated by reference in its entirety.

Figure 1:
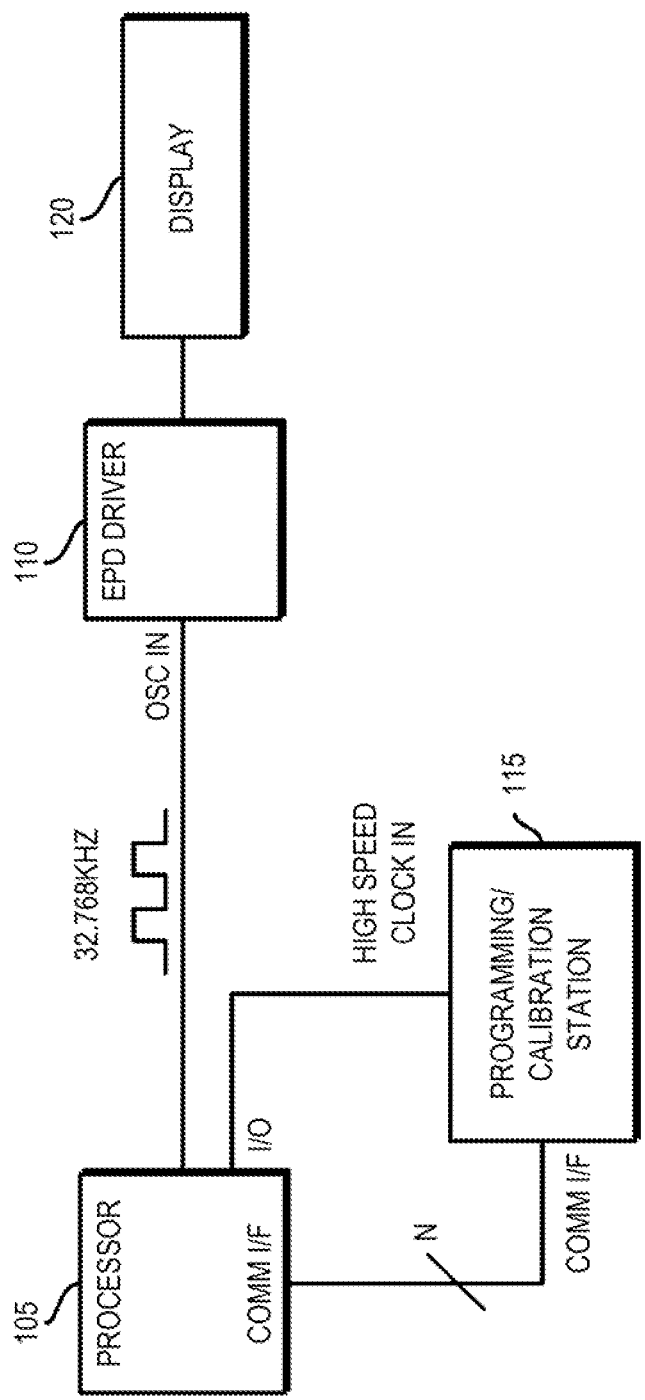
FIGS. 1-4 are block diagrams illustrating in more detail components that may be used in connection with techniques described herein.

Referring now to FIG. 1, shown is an example of an embodiment of a technique for calibrating an internal high-speed clock generator. The calibration system includes a processor 105, couple to electronic paper display (EPD) driver 110. The processor 105 may also be coupled to an external programming/calibration station 115 via, for example, a general purpose I/O pin. The processor 105 and the external programming/calibration station 115 be also be coupled via a communications interface (COMM I/F) comprising N lines (where N may be one or more lines) and may use any suitable communications protocol. The external programming/calibration station 115 may be coupled to the processor 105 during, for example, one or more steps of the manufacturing process. The EPD driver 110 may be coupled to a display, such as an electronic paper display. This and other example embodiments presented herein utilize an electronic paper display as an example application for which techniques describe herein may be used to generate the precise clock such an application requires. However, the techniques described herein should not be construed as being limited to these applications and the techniques are equally applicable to various other applications (e.g., authentication tokens) that require precise internally generated clocks.

In this example, the display 120 may require a precise 32.768 KHz clock signal to successfully present characters on the display 120. To generate such a calibrated clock signal, the processor 105 may be instructed to generate and output a high-speed clock signal on a general purpose input/output (I/O) pin or other applicable output resource. For example, the processor can be instructed to generate a 4.0 MHz reference signal. Although a processor is presented as generating the high-speed clock signal, one or more other electronic devices may be implemented in a similar manner.

The high-speed clock signal (also referred to herein as "high-speed reference clock signal") may be communicated to the externally located programming/calibration station 115 via, for example, a general purpose I/O pin. The programming/calibration station 115 may be configured to precisely measure the signal using appropriate measurement equipment (not shown) such as a frequency counter or other equivalently precise measurement equipment.

The measured result(s) may be compared with the signal's programmed value to determine the difference or error. This result can be used to calculate one or more calibration values. These calculations may be performed at the programming/calibration station 115 and subsequently communicated to the processor via the communications interface in a variety of forms, such as an absolute value in hertz, counter value, time (e.g., nanoseconds), and the like. Alternatively, or in addition, divisor value may be calculated such that the value may be used by the processor 115 to generate the intended output signal. For example, if the 4.0 MHz high-speed clock signal was measured to be 3.997696 MHZ, a divisor of 122 (i.e., 4.0 MHz/3.997696 MHz) may be calculated such that measured signal high-speed signal internal to the processor may be divided by 122 to generate a precise 32.768 KHz clock signal. Other programmed and divisor values may be similarly utilized.

Alternatively, in this and other example embodiments described herein, a metric associated with the measure clock signal value may be communicated back to the processor 105. The processor may then use the metric to perform the aforementioned calculations using internal math functions, an internal or external math co-processor, or other such calculation engine (not shown). In other alternative example embodiments, the calibration techniques described herein may be performed while varying one or more other operating or environmental parameters, such as temperature, voltage, current, time, humidity, atmospheric pressure, vibration, electromagnetic interference (EMI), and radiation. This list is meant illustrate a number of examples but is not exhaustive.

Thus, the processor may generate an internal high-speed clock signal that was previously measured and use the calculated calibration factor to generate an accurate 32.768 KHz output signal that may be communicated to the EPD driver 110. The EPD driver 110 may then communicate this precise clock signal to drive the display 120 in a reliable manner.

Conventional methods are not capable of creating a sufficiently precise clock signal because of the aforementioned semiconductor process related variations. That is, RC circuit networks typically vary from part-to-part by as much as +/−25%. Thus, a 4 MHz clock signal may be as low as 3.0 MHz or as high as 5.0 MHz. For example, the intended signal, when dividing by 122, could be as low as 24.590 KHz or as high as 40.984 KHz. Such a large variation would be far too imprecise to reliably drive a display.

Figure 2:
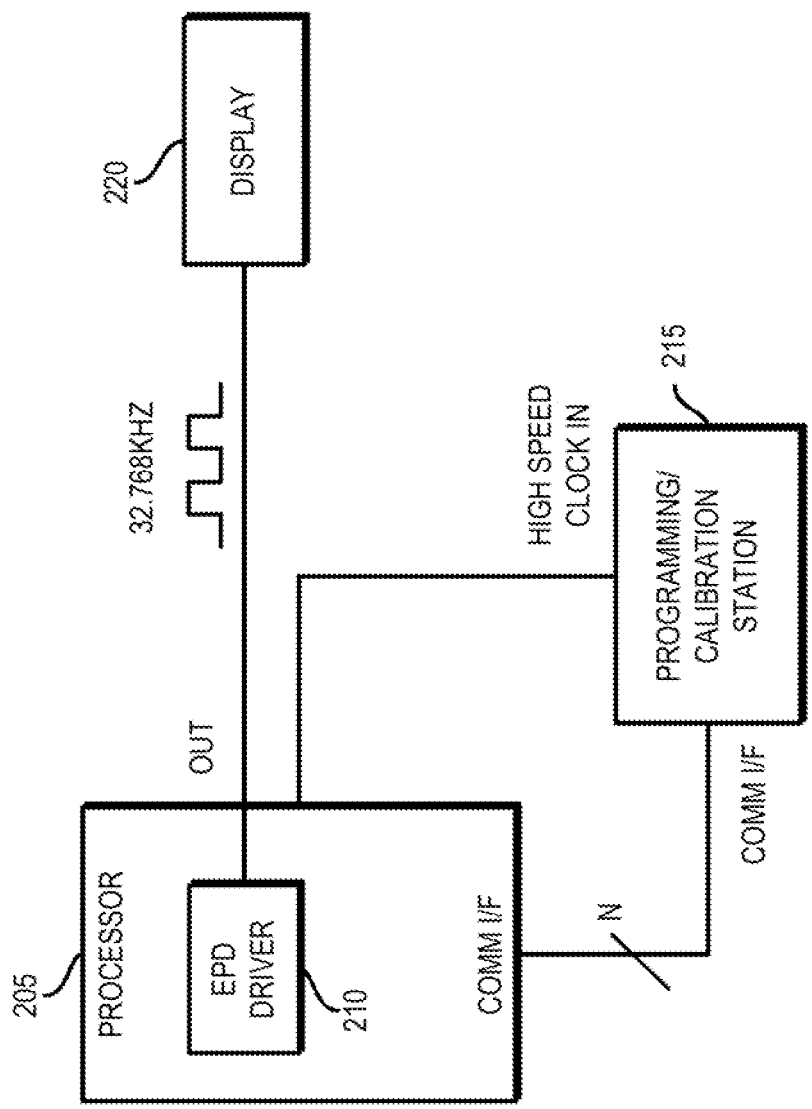

Referring now to FIG. 2, shown is an alternative example embodiment of a technique for calibrating an internal high-speed clock generator. In this example, the system includes a processor 205 that includes an integrated electronic paper display (EPD) driver 210. The processor 205 may also be coupled to an external programming/calibration station 215 via, for example, a general purpose I/O pin. The processor 205 and the external programming/calibration station 215 be also be coupled via a communications interface (COMM I/F) comprising N lines (N may be one or more lines) and may use any suitable communications protocol. The external programming/calibration station 215 may be coupled to the processor 205 during, for example, one or more steps of the manufacturing process. The external programming/calibration station 215 may be coupled to the processor 205 during, for example, one or more steps of the manufacturing process. The EPD driver 210 may be coupled to a display, such as an electronic paper display.

In this example, the display 220 may similarly require a precise 32.768 KHz clock signal to successfully present characters on the display 220. To generate such a calibrated clock signal, the processor 205 may be instructed to generate and output a high-speed clock signal on a general purpose input/output (I/O) pin or other applicable output resource. For example, the processor 205 can be instructed to generate a 4.0 MHz reference signal.

The high-speed clock signal may be communicated to the externally located programming/calibration station 215 via, for example, a general purpose I/O pin. In this example, during the calibration process, the reference clock signal may be routed through the EPD driver 210 in a by-pass mode or, alternatively, may be routed out a different general purpose I/O pin (not shown) to bypass the EPD driver 210 altogether. The programming/calibration station 215 may be configured to precisely measure the signal using appropriate measurement equipment (not shown) such as a frequency counter or other equivalently precise measurement equipment.

The measured result(s) may be compared with the signal's programmed value to determine the difference or error. This result can be used to calculate one or more calibration values. These calculations may be performed at the programming/calibration station 215 and subsequently communicated to the processor via the communications interface in a variety of forms, such as an absolute value in hertz, counter value, time (e.g., nanoseconds), and the like. Alternatively, or in addition, divisor value may be calculated such that the value may be used by the processor 215 to generate the intended output signal in a manner similar to that as described above with reference to FIG. 2.

Alternatively, in this and other example embodiments described herein, a metric associated with the measure clock signal value may be communicated back to the processor 205. The processor 205 may then use the metric to perform the aforementioned calculations using internal math functions, an internal or external math co-processor, or other such calculation engine (not shown).

Figure 3:
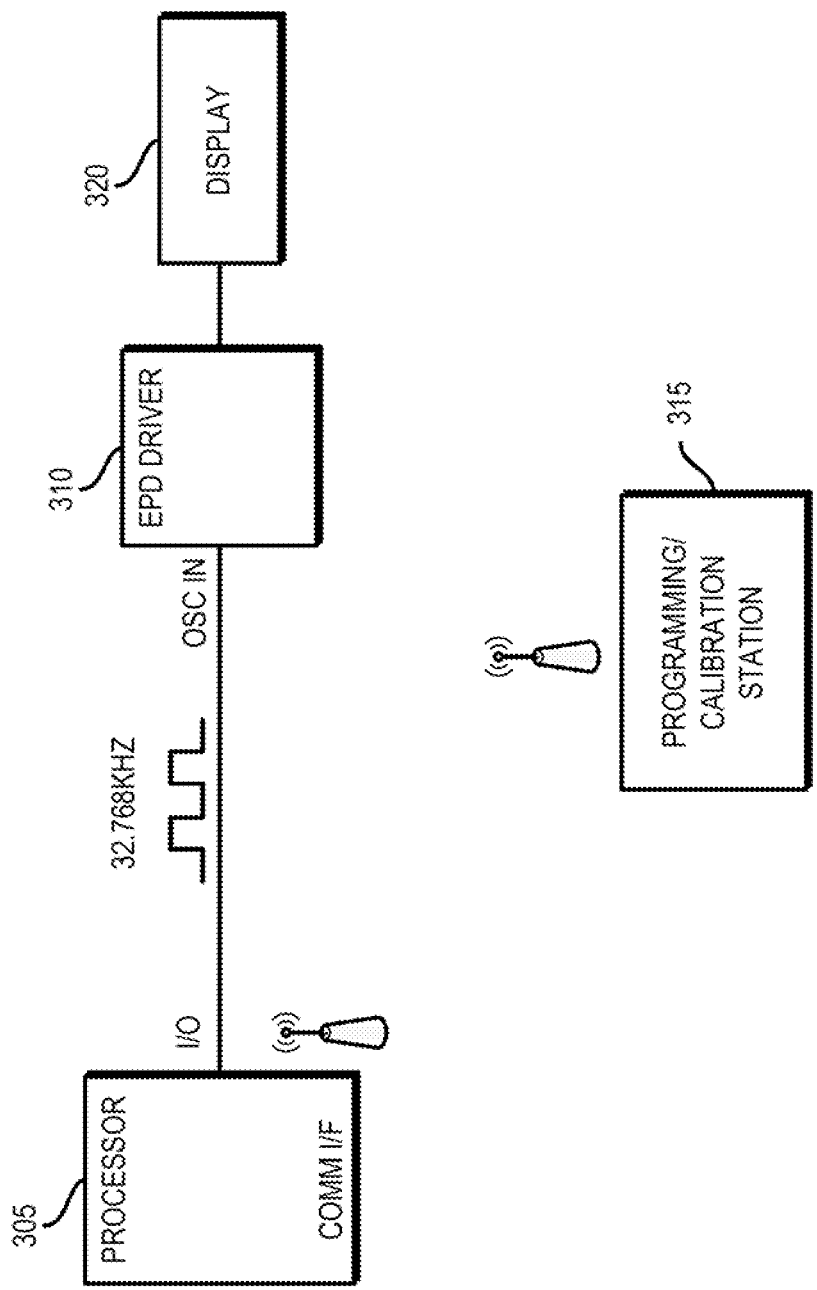

Referring now to FIG. 3, shown is another alternative example embodiment of a technique for calibrating an internal high-speed clock generator. In this embodiment, the calibration system includes a processor 305, couple to electronic paper display (EPD) driver 310. However, in this example, the processor 305 is wireless coupled to an external programming/calibration station 315. Communication between the processor 305 and the programming/calibration station 315 may employ any suitable wireless protocol known in the art as is customary for such situations. For example, radio frequency (RF), infrared, sonar or other wireless technique may be utilized individually or in combination. Alternatively, both the processor 305 and the programming/calibration station 315 may be connected using both wireless and wired communication protocols and environments.

The external programming/calibration station 315 may be wirelessly coupled to the processor 305 during, for example, a calibration step as part of the manufacturing and/or maintenance process. The EPD driver 310 may be directly or indirectly coupled to a display, such as an electronic paper display.

In this example, the display 320 may similarly require a precise 32.768 KHz clock signal to successfully present characters on the display 320. To generate such a calibrated clock signal, the processor 305 may be instructed to generate and wirelessly output a high-speed clock signal on a wireless general purpose input/output (I/O) pin or other applicable wireless output resource. For example, the processor can be instructed to generate a 4.0 MHz reference clock signal.

Although a processor is presented as generating the high-speed clock signal, one or more other electronic devices employing wireless transmission techniques may be implemented in a similar manner.

The 4.0 MHz reference clock signal may be wirelessly communicated to the externally located programming/calibration station 315. Upon receiving the wirelessly transmitted high-speed reference clock signal, the programming/calibration station 315 may be configured to precisely measure the signal using appropriate measurement equipment (not shown) such as a frequency counter or other equivalently precise measurement equipment.

The measured result may be compared with the signal's programmed value to determine the difference or error. This result can be used to calculate one or more calibration values. These calculations may be performed at the programming/calibration station 315 and wirelessly communicated back to the processor in a variety of forms, such as an absolute value in hertz, counter value, time (e.g., nanoseconds), and the like. Alternatively, or in addition, divisor value may be calculated and wireless transmitted such that the value may be used by the processor 315 to generate the intended output signal.

Thus, the processor may generate an internal high-speed clock signal that was previously measured and use the calculated calibration factor to generate an accurate 32.768 KHz output signal that may be communicated to the EPD driver 310. The EPD driver 310 may then communicate this precise clock signal to drive the display 320 in a reliable manner.

Figure 4:
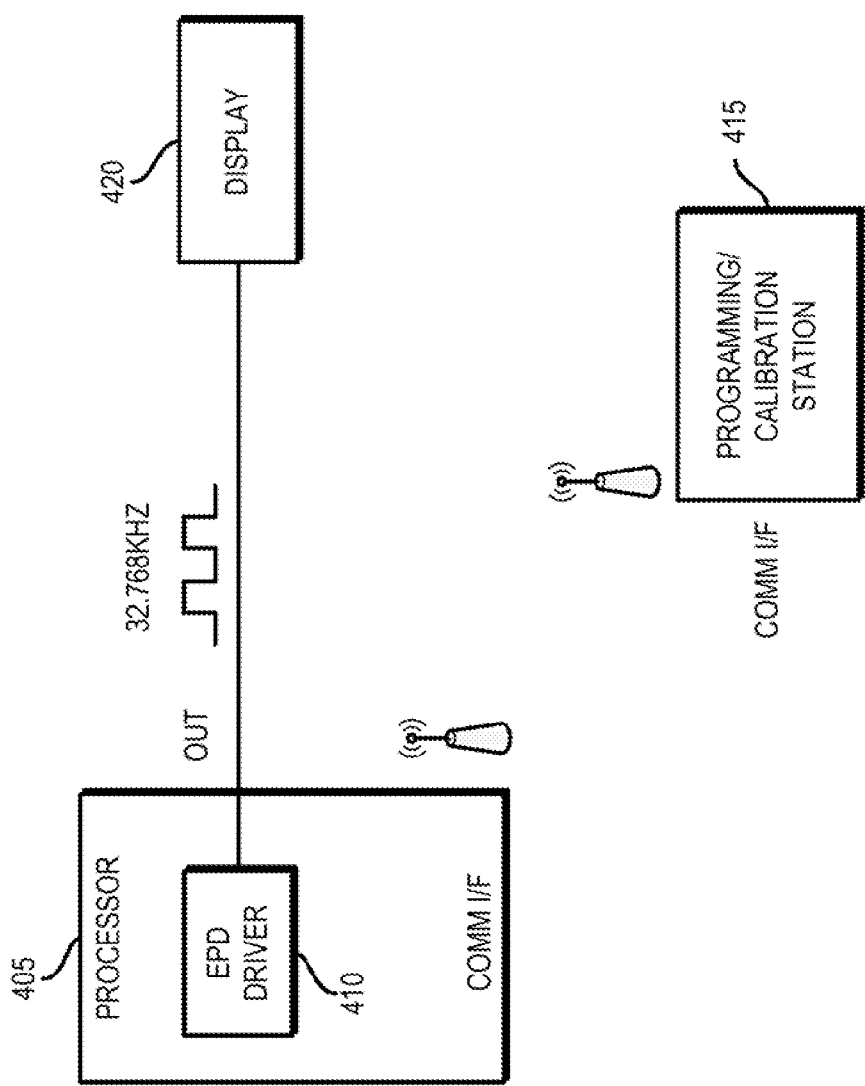

Referring now to FIG. 4, shown is yet another alternative example embodiment of a technique for calibrating an internal high-speed clock generator. In this example, the system includes a processor 405 that includes an integrated electronic paper display (EPD) driver 410. In this example, the processor 405 is in wireless communication with an external programming/calibration station 415. Similar to that described above with referent to FIG. 3, communication between the processor 405 and the programming/calibration station 415 may employ any suitable wireless protocol and techniques known in the art. Alternatively, the processor 405, EPD driver 410, and the programming/calibration station 415 may be connected using both wireless and wired communication protocols and environments.

The external programming/calibration station 415 may be in wireless communication the processor 405 during, for example, one or more steps of the manufacturing process. The EPD driver 410 may be directly or indirectly coupled to a display, such as an electronic paper display.

In this example, the display 420 may similarly require a precise 32.768 KHz clock signal to successfully present characters on the display 420. To generate such a calibrated clock signal, the processor 405 may be instructed to generate and wirelessly communicate a high-speed clock signal on a wireless general purpose input/output (I/O) pin or other applicable wireless output resource.

The 4.0 MHz high-speed reference clock signal may be wirelessly communicated to the externally located programming/calibration station 415. In this example, during the calibration process, the reference clock signal may be routed through the EPD driver 410 or, alternatively, may be routed out a different wireless general purpose I/O pin (not shown) to bypass the EPD driver 410 altogether. The programming/calibration station 415 may be configured to precisely measure the signal using appropriate measurement equipment (not shown) such as a frequency counter or other equivalently precise measurement equipment.

The measured result may be compared with the signal's programmed value to determine the difference or error. This result can be used to calculate one or more calibration values. These calculations may be performed at the programming/calibration station 415 and then wirelessly communicated back to the processor in a variety of forms, such as an absolute value in hertz, counter value, time (e.g., nanoseconds), and the like. Alternatively, or in addition, divisor value may be calculated such that the value may be used by the processor 415 to generate the intended output signal in a manner similar to that as described above with reference to FIG. 4.

Figure 5:
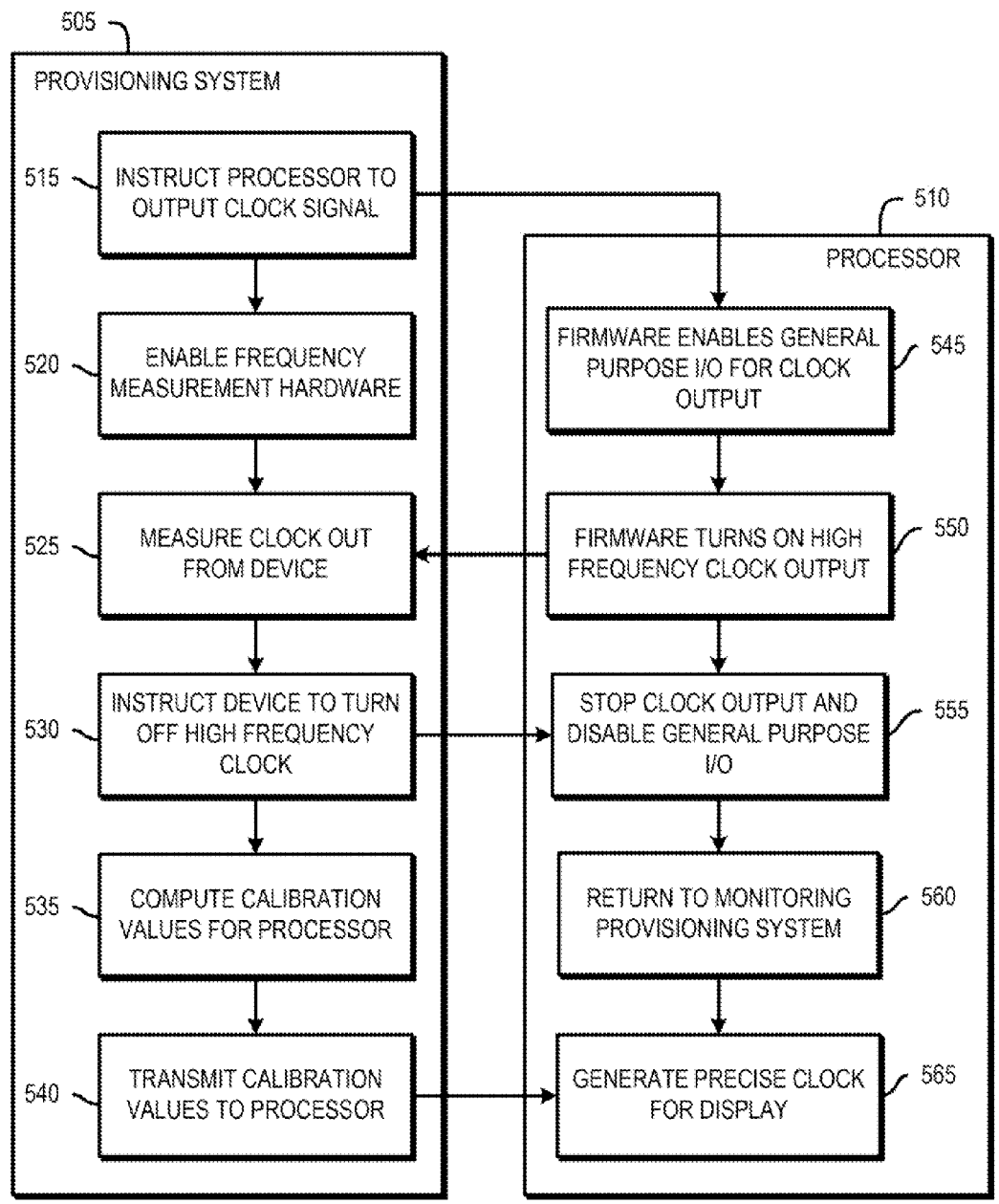
FIG. 5 is a flow diagram illustrating an example process that may be used in connection with techniques described herein.

Referring to FIG. 5, shown is a flow diagram illustrating an example method for use in calibrating an internal high-speed clock generator. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the calibration method can begin with a step 515 via an instruction from a provisioning system 505. The method can be initiated manually by a user, for example, by entering a command in a command-line-interface or by clicking on a button or other object in a graphical user interface (GUI). The method can also be initiated automatically by storage management software and/or can be scheduled to run automatically at certain dates and times.

At step 515, the provisioning system 505 may initiate an instruction instructing a processor 510 to output a high-speed reference clock signal. The provisioning system 505 (e.g., a programming/calibration system) that may one or more systems used during the manufacturing process and/or in the field during maintenance procedures. The output clock signal may be a reference signal used to calibrate out process variations inherently present as part of the semiconductor fabrication process.

In step 520, the provisioning system 505 may enable measurement hardware such as a frequency counter or other suitably precise measurement system. Meanwhile, at step 545, firmware on the processor 510 may enable a general purpose I/O pin to output a high-speed reference clock signal. At step 550, the processor 510 turns on the high-speed reference clock signal which is communicated to the provisioning system 505. The provisioning system 505, at step 525, may then measure the high-speed reference clock signal generated by the processor 510. Once the provisioning system 505 completes the measurement process, the processor 510 is instructed to stop transmitting the high-speed reference clock signal at step 555. At step 560, the processor 510 is instructed to monitor the provisioning system 505.

The provisioning system 505 may calibrate a metric representative of a calibration value that may be used to calibrate a processor 510 output signal. At step 540, depending on the particular implementation details described herein, calibration information may be transmitted back to the processor 510. At step 565, the processor 510 may then generate a precise clock signal that may be used, for example, to drive an EPD driver. As described above, various communication steps may be performed via wired and/or wireless transmission techniques. Calibration calculations and processes may be performed at the provisioning system 505 and/or the processor 510 and/or other external devices (not shown).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for calibrating an internal clock generator, the method comprising:
    instructing an electronic authentication device to output a high-speed clock signal, wherein the high-speed clock signal is generated using a processor internal to the electronic authentication device and without using a crystal oscillator;
    communicating the high-speed clock signal to an external calibration system;
    measuring the high-speed clock signal using measurement equipment associated with the external calibration system to derive a high-speed clock signal value, wherein measuring occurs during a manufacturing process step when manufacturing the electronic authentication device;
    calculating one or more calibration values based on the measured high-speed clock signal value;
    communicating the one or more calibration values to the electronic authentication device; and
    instructing the electronic authentication device to generate a calibrated clock signal by applying the one or more calibration values to the high-speed clock signal.

2. The method of claim 1, wherein the high-speed clock signal is approximately 4 MHz and the calibrated clock signal is 32.768 KHz.

3. The method of claim 1, wherein communicating further includes performing communications wirelessly.

4. The method of claim 1, wherein measuring further includes measuring the high-speed clock using a frequency counter associated with the external calibration system.

5. The method of claim 1, wherein calculating further includes calculating a divisor for dividing a high-speed clock signal generated by the device.

6. The method of claim 1, wherein the electronic authentication device includes two or more electronic devices.

7. The method of claim 1, wherein the electronic authentication device is a microprocessor and communicating the high-speed clock signal to an external calibration system further includes communicating the high-speed clock signal via a general purpose I/O pin on the microprocessor.

8. The method of claim 1, further including varying one or more operating or environmental parameters.

9. The method of claim 1, further including communicating the generated calibrated clock signal to a display driver.

10. The method of claim 9, wherein the display driver is an electronic paper display driver.

11. A system for calibrating an internal clock generator, the system comprising:
    first logic configured to instruct an electronic authentication device to output a high-speed clock signal, wherein the high-speed clock signal is generated using a processor internal to the electronic authentication device without using a crystal oscillator;
    second logic configured to communicate the high-speed clock signal to an external calibration system;
    third logic configured to measure the high-speed clock signal using the external calibration system to derive a high-speed clock signal value, wherein measure occurs during a manufacturing process step when manufacturing the electronic authentication device;
    fourth logic configured to calculate one or more calibration values based on the measured high-speed clock signal value;
    fifth logic configured to communicate the one or more calibration values to the electronic authentication device; and
    sixth logic configured to instruct the electronic authentication device to generate a calibrated clock signal by applying the one or more calibration values to the high-speed clock signal.

12. The system of claim 11, wherein the high-speed clock signal is approximately 4 MHz and the calibrated clock signal is 32.768 KHz.

13. The system of claim 11, wherein the second logic and fifth logic are further configured to communicate wirelessly.

14. The system of claim 11, wherein the third logic is further configured to measure the high-speed clock using a frequency counter associated with the external calibration system.

15. The system of claim 11, wherein the fourth logic is further configured to calculate a divisor for dividing a high-speed clock signal generated by the device.

16. The system of claim 11, wherein the electronic authentication device includes two or more electronic devices.

17. The system of claim 11, wherein the electronic authentication device is a microprocessor and communicating the high-speed clock signal to an external calibration system further includes communicating the high-speed clock signal via a general purpose I/O pin on the microprocessor.

18. The system of claim 11, further including varying one or more operating or environmental parameters.

19. The system of claim 11, further including seventh logic configured to communicate the generated calibrated clock signal to a display driver.

20. The system of claim 19, wherein the display driver is an electronic paper display driver.

* * * * *